Oct. 4, 1927.
C. S. BARRELL
1,644,627
TIRE CHAIN LINK
Filed May 31, 1924
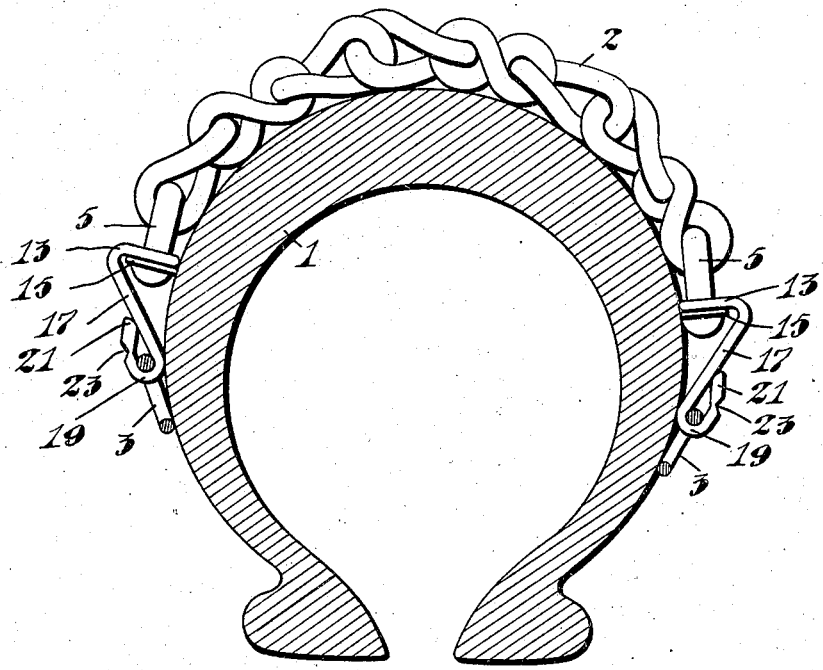
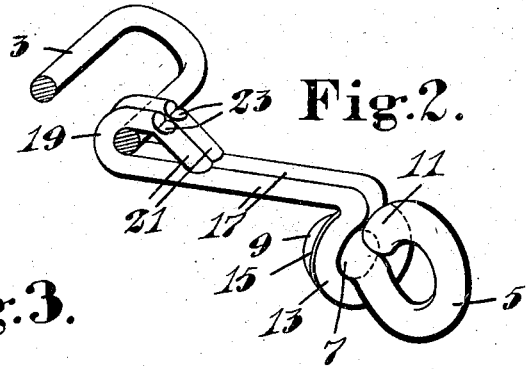
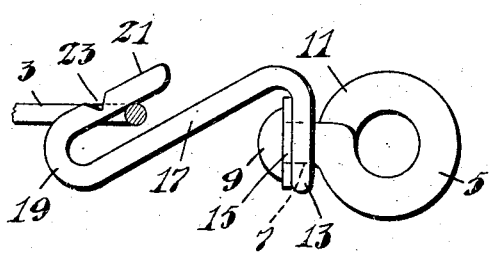
INVENTOR
Charles S. Barrell
by Henry T. Williams,
Atty.

Patented Oct. 4, 1927.

1,644,627

UNITED STATES PATENT OFFICE.

CHARLES S. BARRELL, OF BOSTON, MASSACHUSETTS.

TIRE-CHAIN LINK.

Application filed May 31, 1924. Serial No. 716,967.

The invention to be hereinafter described relates to links or hooks for connecting the ends of the cross chains to the circular side chains of tire chains.

In use the cross chains eventually become so worn on their tread portions that they break, making it necessary to disconnect the loose end portions from the side chains and to connect in new cross chains in place of the broken ones. The end links of the cross chains of the usual tire chains are hard and tough so that opening of said links to enable their separation from the side chains, is an awkward, difficult and time consuming operation, often requiring the services of a mechanic or the use of a special tool.

The aim and purpose of the present invention, therefore, is to provide simple, cheap links or hooks which may be quickly and easily opened or closed to enable their separation from or connection with their holding means, such, for example, as links of the circular side chains.

The character of the invention may be best understood by reference to the following description of one good form thereof shown in the accompanying drawing, wherein:

Fig. 1 is a transverse section through a tire equipped with a tire chain having hooks embodying the invention;

Fig. 2 on an enlarged scale is a perspective view of one of the hooks for connecting the ends of the cross chain with the side chains; and Fig. 3 is a side view of the hook shown in Fig. 2, the hook being open to receive or release one of the links of the circular side chain.

Referring to the drawing, 1 (Fig. 1) designates a shoe of usual construction of a pneumatic tire and 2 designates one of the cross members or chains of a tire chain connected to links of the usual circular side chains which are located at the sides of the tire, or the cross chains may be connected to any other suitable holding element.

At each end of the cross chain, a link 5 is provided having a stud 7 integral therewith provided with a head 9. The link has its eye formed by bending the wire of which the link is made around so that its end 11 engages the side of the stud 7.

The hook, in the present embodiment of the invention, comprises a wire bent intermediate its ends to present an eye 13 which may receive the link stud 7. A washer 15 is interposed between the eye 13 and the stud head 9. Projecting from the eye 13 are arms 17 having their shanks extending in parallel relation and preferably transversely to the plane of the eye 13. The arms 17 are reversely bent to present seats 19 of a strong, rigid character, and said arms have end portions 21 which combine with the arms and seats to form registering eyes.

An important feature of the present invention is the construction which enables the end portions to be quickly and easily bent toward or from the shanks of the arms 17 permanently to open or close the registering eyes. To accomplish this, in the present embodiment of the invention, the end portions 21 have reduced portions which may be in the form of depressions or notches 23 (Fig. 2). The metal of the reduced portions is bendable, permanently to position the end of the hook close to the shank of the hook or separated therefrom. The wire from which the hook is formed may have resilience when of substantial length, but the end portions 21 are so short in proportion to their thickness that they are virtually without resilience.

A new cross chain will have terminal hooks with end portions 21 standing in open position (Fig. 3) in readiness to be connected to the side chains. After the hooks have been presented to links of the side chains the end portions of the arms are bent down to meet the shanks of the arms. When it is desired to release the hooks from the side chains to remove the loose ends of a broken cross chain, the end portions 21 of each hook are bent away from the shank of the hook.

It will be understood that the invention is not limited to the specific embodiment shown, and that various deviations may be made therefrom without departing from the spirit and scope of the appended claims.

What is claimed is:—

1. A hook adapted to be secured to the end of a cross member of a tire chain, comprising an arm having a rigid reverse bend forming a seat adapted to receive a holding element, an end portion projecting from said rigid seat combining with said arm and reverse bend to form an eye, and a notch formed in said end portion thereby facilitating ready bending of the end portion toward and from said arm to close and open said eye.

2. A hook adapted to be secured to the end of a cross member of a tire chain, said hook having a rigid reverse bend forming a seat, and an end portion beyond the seat having a depression for locally weakening the end portion, that the end portion may be readily bent to position permanently the tip of said end portion close to the shank of the hook or separated therefrom.

3. A hook adapted to be secured to the end of a cross member of a tire chain, said hook being of wire formed to provide an eye for connection with the cross member, an arm projecting from said eye having a rigid reverse bend presenting a seat for receiving a link of a side chain, a substantially rigid end portion projecting from said rigid reverse bend toward the arm for preventing escape of the side chain link from the hook, said reverse bend and end portion having a notch weakening at the juncture thereof to facilitate bending of the end portion away from the arm to allow release of the hook from the side chain link.

4. An attaching link formed from a single length of metal bent intermediate its ends to define a pair of arms, the terminal portions of which are formed with return bends defining bills, said bills being formed with notches intermediate their ends by means of which the ends of the bills may be forced inwardly.

5. An attaching link for anti-skid chains comprising a single length of metal bent intermediate its ends to provide a pair of converging side arms, the terminal portions of which are formed with return bends adapted to be engaged with the side chain links of an anti-skid chain and defining bills, said bills being formed intermediate their ends and at points substantially beyond said bends and the material engaged thereby with notches reducing the cross sectional area of the length of metal whereby the terminal portions of the bills may be swung inwardly.

CHARLES S. BARRELL.